Dec. 2, 1969     TORU KARIKAWA     3,481,553

CAMERA SHUTTER COCKING AND FILM ADVANCING MECHANISM

Filed Nov. 13, 1967

SPOOL DRIVE ELEMENT

INVENTOR
TORU KARIKAWA
BY Stanley Wolder
ATTORNEY

United States Patent Office 3,481,553
Patented Dec. 2, 1969

3,481,553
CAMERA SHUTTER COCKING AND FILM ADVANCING MECHANISM
Toru Karikawa, Tokyo-to, Japan, assignor to Asahi Kogaku Kogyo Kabushiki Kaisha, Tokyo-to, Japan, a corporation of Japan
Filed Nov. 13, 1967, Ser. No. 682,032
Claims priority, application Japan, Dec. 16, 1966, 41/114,682
Int. Cl. G03b 1/06
U.S. Cl. 242—71.5     7 Claims

ABSTRACT OF THE DISCLOSURE

A shutter cocking and film winding mechanism comprises a spool winding driven member including a hollow shaft, and a drive member having a cocking gear, a shaft rotatably registering with the hollow shaft and an enlarged coaxial cylindrical section. A helical spring encircles the cylindrical section and includes one end affixed to the spool winding member and an opposite end affixed to a rotatable stop member. The spring is tightened by rotation of the drive member, to couple the drive and driven members and is loosened by the stopping of the rotatable stop member to uncouple the drive and driver member.

BACKGROUND OF THE INVENTION

The present invention relates generally to improvements in cameras and it relates particularly to an improved mechanism for winding or advancing the film in a camera and simultaneously cocking the camera shutter.

In still cameras of the uniform frame size type, particularly those employing a roll film without perforations such as a Brownie type film, the diameter of the film roll wound on the take-up spool increases as the number of exposed frames increases, so that with each successive frame the angle of rotation of the take-up spool must be correspondingly decreased to maintain a uniform increment of film advance. It is known in the art to employ a cam or roller arrangement in this connection.

It is conventional in still cameras to employ a common manually driven member to simultaneously cock or load the shutter and advance a film a unit frame and it is a common expedient to provide a slip type clutch or coupling in the shutter cocking and film winding mechanism to permit the continued cocking or winding operation following the completion of one of the operations by reason of varying differences between the required degreees of motivation of such operations. While a differential motion transmission may be employed to attain the above end in the absence of slippage, this results in a highly complicated and expensive mechanism. The use of a slip type transmission to permit simultaneous and successive separate drive of the cocking and winding devices results in a much simpler mechanism than the use of the differential transmission. However, in order to achieve any reliability in the operation of the mechanism employing a slip coupling it is necessary that the slip inducing torque be very high. As a consequence, the turning torque required to complete the shutter cocking or film winding operations following the completion of one of these, abruptly sharply increases thereby resulting in an awkward procedure and operation, which is inconvenient, often misleading and otherwise leaves much to be desired.

SUMMARY OF THE INVENTION

It is a principal object of the present invention to provide an improved camera.

Another object of the present invention is to provide in a still camera an improved shutter cocking and film advancing mechanism.

Still another object of the present invention is to provide in a still camera an improved shutter cocking and film frame advancing mechanism of the slip clutch coupled type.

A further object of the present invention is to provide an improved clutch type shutter cocking and film frame advancing mechanism in which no appreciable increase in the mechanism motivating torque is experienced following the termination of the shutter cocking or film frame advancing operation.

Still a further object of the present invention is to provide a mechanism of the above nature characterized by its reliability, ruggedness, compactness, simplicity and ease and convenience of operation.

The above and other objects of the present invention will become apparent from a reading of the following description taken in conjunction with the accompanying drawing which illustrates a preferred embodiment of the present invention as well as a conventional shutter cocking film advancing mechanism.

According to a preferred form of the present mechanism the driven winding member comprises a hollow spool shaft and the drive member includes a shaft section engaging the hollow spool shaft, an enlarged cylindrical section and a winding knob carrying section. The helical spring encircles the cylindrical section with one end thereof engaging a slotted eccentric element supported by the spool shaft and the other end thereof engaging a slotted element mounted eccentrically on a stop gear coaxially rotatably supported by the drive and driven members. A shutter cocking gear is affixed to the drive member. The turning of the drive member and the rotation of the stop gear effects the tightening of the spring on the cylindrical section and the drive coupling of the drive and driven members, the spring unwinding upon stopping of the stop gear attendant to the full frame advance of the film. Accordingly, the termination of the film advancing operation is not accompanied by any appreciable increase in the turning torque during the completion of the shutter cocking operation.

DESCRIPTION OF THE PREFERRED EMBODIMENT

Figure 1:
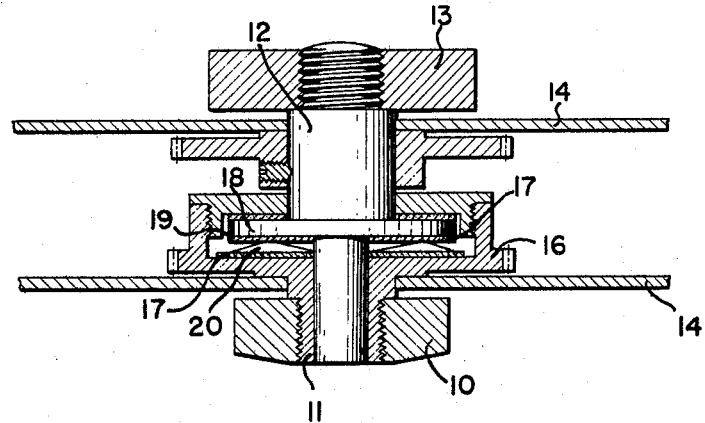
FIGURE 1 is a longitudinal sectional view of a conventional type of film advancing and shutter cocking mechanism.

As seen in FIGURE 1 of the drawing a conventional type of film advancing and shutter cocking mechanism includes a spool winding driven member 10 having a hollow shaft 11 and a coaxial drive member 12 carrying a knob 13 the members 10 and 12 being journalled in body member panels 14. A stop gear 16 is integrally formed with the driven member 10 and is provided with upper and lower confronting faces 17 having friction surfaces. The drive member 12 includes an integrally formed disc section 18 positioned between the drive member confronting face and is provided with a friction surfaced undersurface 19. An axially expanding annular friction spring 20 is entrapped between the friction undersurface 19 and the confronting friction surface 17 to provide friction type slip coupling between the driven and drive members 10 and 12. A shutter cocking gear is affixed to the drive member 12.

In order to assure an adequate drive of the spool driving member 10 it is essential that a high torque friction slip coupling be effected between the members 10 and 12. As a consequence, upon completion of a film frame advance and the stopping of the gear 16 there is an abrupt sharp increase in the turning torque required for the drive member 12 to complete the cocking of the shutter and to provide sufficient force to effect slippage between the members 10 and 12. This drawback and disadvantage is overcome by the improved mechanism shown in FIGURES 2 and 3 of the drawing.

Figure 2:
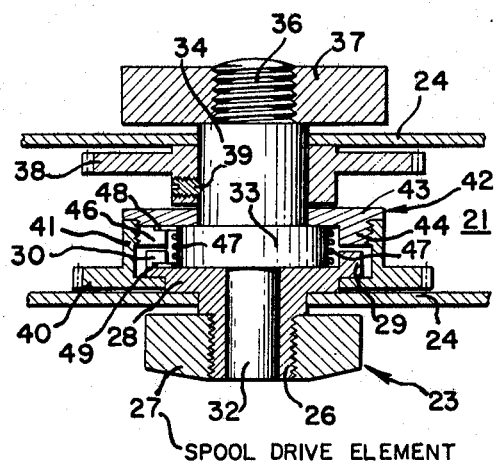
FIGURE 2 is a longitudinal sectional view of a film advancing and shutter cocking mechanism embodying the present invention.
Figure 3:
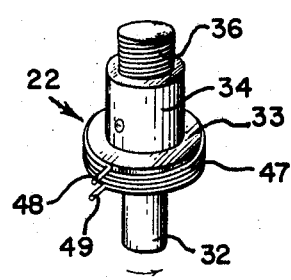
FIGURE 3 is a perspective view of the drive member and coupling spring in assembled condition.

Referring now to FIGURES 2 and 3 which illustrate a preferred embodiment of the present invention, the reference numeral 21 generally designates the improved shutter cocking and film advancing drive mechanism which includes a manually rotatable drive winding member 22 and an associated coaxial spool rotating driven winding member 23, the winding members 22 and 23 being journalled and extending between and beyond a pair of spaced parallel body member mounting plates 24.

The driven member 23 includes a hollow shaft 26 supporting for rotation therewith a spool drive element 27 below the lower plate 24 and is provided with an enlarged annular head 28 abutting the top face of the lower plate 24. An annular lip 29 is directed upwardly from the periphery of the head 28 and is provided with a radial slot 30, a radial face of which defines an eccentrically located abutment element.

The drive member 22 comprises an integrally formed, bottom stub shaft section 32, an enlarged intermediate cylindrical section 33 positioned directly above the stub shaft 32, and an upper shaft section 34, provided with an upwardly projecting coaxial threaded shank 36. The lower stub shaft section 32 rotatably engages the axial bore of the hollow 26 and the upper shaft section 34 projects through and is journalled in the upper plate 24. A winding knob 37 having a tapped axial bore engages the threaded shank 36 above the upper plate 24.

A gear 38 engages the shaft section 34 directly below the upper plate 24 and is affixed thereto by a set screw 39, the gear 38 being connected in the known manner to the shutter loading or cocking mechanism whereby rotation of the gear 38 effects the cocking of the shutter.

A freely rotatable stop gear 40 is located shortly above the lower plate 24 and includes a circular central opening rotatably registering with the driven member head section 28 and having a top face which abuts the underface of the lip 29. A cylindrical housing defining peripheral circular wall 41 coaxial with the gear 40 is directed upwardly from the top face of the gear 40 inwardly of the outer periphery thereof and has a thread formed in its upper inner face. A cap member 42 includes an annular top wall 43 rotatably engaging the shaft section 34 and slidably resting on the cylindrical section 33 and engaging the top edge of the peripheral wall 41. Depending from the wall 43 is an integrally formed externally threaded, heavy sleeve 44 which tightly engages the threaded section of the wall 41 and is provided with a radial slot 46, a radial face of which defines an eccentrically located abutment element.

A multi-convolution helical coupling spring 47 formed of resilient metal wire is wound about the outer peripheral base of the cylindrical section 33 clockwise downwardly as viewed from the top and snugly engages the cylinildrical section peripheral face. The upper end of the spring 47 terminates in a radially projecting leg 48 which engages the slot 46 and the lower end of the spring 47 terminates in a radially projecting leg 49 which engages the slot 30.

In the operation of the improved mechanism described above, the drive member 22 is turned counterclockwise, as viewed from above, by means of the knob 37 to turn the gear 38 which effects the cocking of the camera shutter. Simultaneously therewith, the spring 47 is tightened on the cylindrical section 33 by reason of the turning of the section 33 and the load on the lower end of the spring 47 by the driven member 23 through the spring leg 49 and the slot 30 to effect a tight frictional engagement between the spring 47 and the cylindrical section 33 and a drive coupling between the members 22 and 23, the gear 40 and wall 44 being freely rotatable. The rotation of the driven member 23 effects the winding of the film until an increment frame has been advanced at which time the gear 40 is automatically stopped in the known manner. With the stopping of the gear 40 the upper end of the spring 47 is prevented from rotating by the slot 46 and leg 48 to effect the unwinding and loosening of the spring 47 from the cylindrical section 48 so that the drive member 22 is uncoupled from the driven member 23 reducing its turning torque and permitting the spring unloaded rotation of the drive member 22 and the completion of the shutter cocking operation without the requirement of any additional force. The stopping of the rotation of the upper end of the spring 47 stops the rotation of the lower end of the spring 47 as well to halt further rotation of the driven member 23 and any further winding of the film.

While there has been described and illustrated a preferred embodiment of the present invention, it is apparent that numerous alterations, omissions and additions may be made without departing from the spirit thereof.

What is claimed is:

1. A camera film winding and shutter cocking mechanism comprising a rotary driven winding member, a selectively rotated drive winding member, means for connecting said drive winding member to the camera shutter cocking mechanism, a helical coupling spring having first and second end sections and encircling one of said winding members, means connecting said first end section to the other of said winding members and restricting relative rotation between said first end section and said other winding member whereby a retarding force exerted by said driven member effects the tightening of said spring about said respective winding member and the drive coupling of said winding members, and stop means responsive to a predetermined condition for stopping the second end section of said spring to effect the loosening of said spring and the uncoupling of said winding members.

2. The film winding mechanism of claim 1 wherein said driven member comprises a spool drive shaft and said connecting means includes an eccentrically located element rotatable therewith with said spool drive shaft and engaging said spring first end section.

3. The film winding mechanism of claim 1 wherein said stop means comprises a control member coaxially rotatably supported relative to one of said winding members and including an eccentrically located element engaging said spring second end section.

4. The film winding mechanism of claim 1 wherein said winding members are coaxial, said drive member including a cylindrical section, said helical spring encircling said cylindrical section, said driven member comprising a spool drive shaft, said connecting means including an eccentrically located first element rotatable with said spool drive shaft and engaging said spring first end section and said stop means comprises a control member coaxially rotatably supported relative to said winding members and including an eccentrically located second element engaging said spring second section.

5. The film winding mechanism of claim 4 including a shutter cocking drive gear mounted on said drive member and rotatable therewith.

6. The film winding mechanism of claim 4 wherein said control member comprises a gear.

7. The film winding mechanism of claim 4 wherein one of said winding members includes an axially bored shaft and the other of said winding members includes a shaft registering with said axially bored shaft, said control member comprising a cylindrical housing rotatably supported by said winding members and enclosing said helical spring and said drive member cyclindrical section, said second element being disposed within and mounted on said housing.

References Cited

UNITED STATES PATENTS

| 2,380,034 | 7/1945 | Doyle | 242—71.5 |
| 2,914,268 | 11/1959 | Tafel et al. | 242—71.5 |

NATHAN L. MINTZ, Primary Examiner